(12) United States Patent
Allen et al.

(10) Patent No.: US 7,783,663 B2
(45) Date of Patent: Aug. 24, 2010

(54) DYNAMIC PATH PARTITIONING TO MULTIPATH STORAGE DEVICES

(75) Inventors: James P. Allen, Austin, TX (US);
Timothy M. Damron, Austin, TX (US);
Stephen M. Tee, Marble Falls, TX (US);
Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/029,202

(22) Filed: Feb. 11, 2008

(65) Prior Publication Data

US 2008/0133810 A1   Jun. 5, 2008

Related U.S. Application Data

(63) Continuation of application No. 10/976,261, filed on Oct. 28, 2004, now Pat. No. 7,337,235.

(51) Int. Cl.
*G06F 7/00* (2006.01)
*G06F 17/30* (2006.01)

(52) U.S. Cl. .............. 707/782; 707/999.101; 707/999.102; 707/999.107; 709/238; 709/239; 709/240

(58) Field of Classification Search .......... 707/782, 707/999.101, 999.102, 999.107; 709/238, 709/239, 240
See application file for complete search history.

(56) References Cited

U.S. PATENT DOCUMENTS

| 6,145,028 | A  | * | 11/2000 | Shank et al. | 710/31 |
| 6,434,637 | B1 | * | 8/2002  | D'Errico | 710/38 |
| 6,535,954 | B2 | * | 3/2003  | Obara et al. | 711/114 |
| 6,578,050 | B1 | * | 6/2003  | Daggubati et al. | 707/782 |
| 6,580,715 | B1 | * | 6/2003  | Bare | 370/396 |
| 6,728,770 | B1 | * | 4/2004  | Bradford et al. | 709/226 |
| 6,898,609 | B2 | * | 5/2005  | Kerwin | 707/782 |
| 7,065,526 | B2 | * | 6/2006  | Wissner et al. | 707/782 |
| 7,127,545 | B1 | * | 10/2006 | Nandi et al. | 710/316 |
| 2004/0078632 | A1 | * | 4/2004 | Infante et al. | 714/5 |

* cited by examiner

*Primary Examiner*—Jean M Corrielus
*Assistant Examiner*—Phong Nguyen
(74) *Attorney, Agent, or Firm*—Yee & Associates, P.C.; Matthew W. Baca

(57) ABSTRACT

A mechanism is provided for balancing I/O among available paths connected to a device. The mechanism partitions paths so a device can use all or only a subset of available paths to a device, depending on the load of I/O for other devices that are sharing the paths. The partitioning of paths is dynamic, readjusting as I/O loads change for the devices.

7 Claims, 3 Drawing Sheets

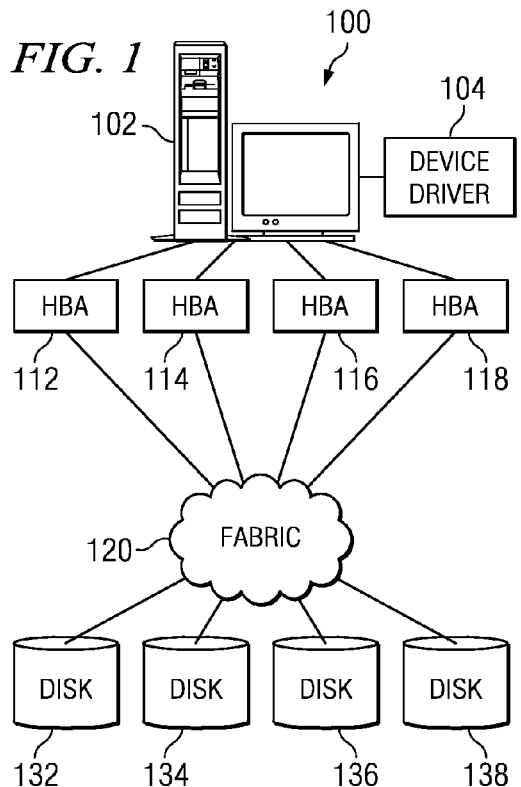
FIG. 1
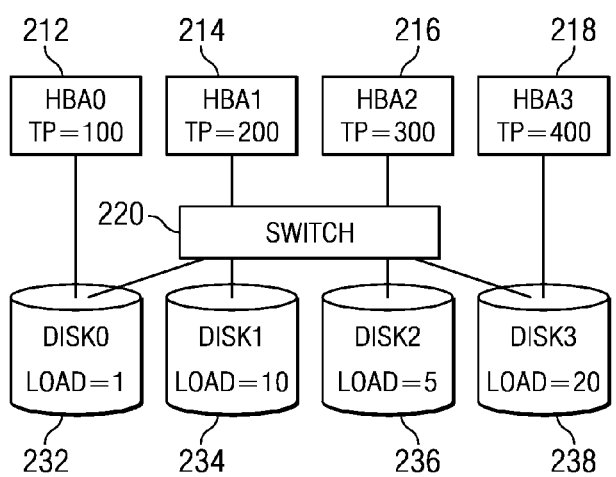
FIG. 2A
FIG. 2B
| PATH | DEVICES |
|------|---------|
| HBA0 | DISK0 |
| HBA1 | DISK3<br>DISK1<br>DISK2<br>DISK0 |
| HBA2 | DISK3<br>DISK1<br>DISK2<br>DISK0 |
| HBA3 | DISK3 |
FIG. 2C
| DEVICE | PATHS |
|--------|-------|
| DISK0 | HBA0<br>HBA1<br>HBA2 |
| DISK1 | HBA1<br>HBA2 |
| DISK2 | HBA1<br>HBA2 |
| DISK3 | HBA1<br>HBA2<br>HBA3 |

| PATH | DEVICES |
|---|---|
| HBA0 | DISK0 |
| HBA1 | DISK3 DISK1 DISK2 DISK0 |
| HBA2 | DISK3 |
| HBA3 | DISK3 |

| DEVICE | PATHS |
|---|---|
| DISK0 | HBA0 HBA1 |
| DISK1 | HBA1 |
| DISK2 | HBA1 |
| DISK3 | HBA1 HBA2 HBA3 |

| PATH | DEVICES |
|---|---|
| HBA0 | DISK0 |
| HBA1 | DISK3 DISK1 DISK2 |
| HBA2 | DISK3 |
| HBA3 | DISK3 |

| DEVICE | PATHS |
|---|---|
| DISK0 | HBA0 |
| DISK1 | HBA1 |
| DISK2 | HBA1 |
| DISK3 | HBA1 HBA2 HBA3 |

DYNAMIC PATH PARTITIONING TO MULTIPATH STORAGE DEVICES

This application is a continuation of application Ser. No. 10/976,261, filed Oct. 28, 2004, status, now U.S. Pat. No. 7,337,235.

BACKGROUND OF THE INVENTION

1. Technical Field

The present invention relates to data processing and, in particular, to multipath storage devices. Still more particularly, the present invention provides a method, apparatus, and program product for dynamic path partitioning to multipath storage devices.

2. Description of Related Art

Multipathing storage devices provide a more reliable and better performing storage solution compared to conventional single path attached storage devices. One or more host devices may connect to a storage network. For example, a single host device may connect to a storage network through two or more host bus adapters. The storage network may include one or more switches and/or routers. Furthermore, the storage network may include a plurality of storage devices, such as hard disk drives. As a result, there may be many paths from a host device to a particular storage device.

Complicated algorithms may be employed to load balance input and output (I/O) in the most efficient manner possible for maximum throughput. These algorithms are based on balancing I/O among the available paths connected to a device.

SUMMARY OF THE INVENTION

The present invention recognizes the disadvantages of the prior art and provides a mechanism for balancing I/O among available paths connected to a device. The present invention partitions paths so a device can use all or only a subset of available paths to a device, depending on the load of I/O for other devices that are sharing the paths. The partitioning of paths is dynamic, readjusting as I/O loads change for the devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of an example storage network in which the present invention may be implemented;

FIG. 2A depicts an example storage network configuration in accordance with a preferred embodiment of the present invention;

FIGS. 2B and 2C are examples that illustrate information collected for the storage network configuration shown in FIG. 2A in accordance with an exemplary embodiment of the present invention

DETAILED DESCRIPTION OF THE PREFERRED EMBODIMENT

Figures 3A, 3B, 4A, 4B, 4C:
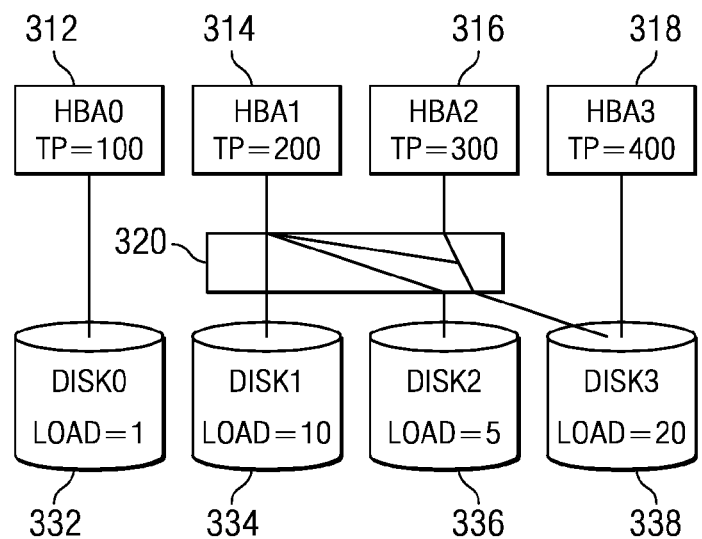
FIGS. 3A and 3B illustrate the updated device list and path list after a first pass of partitioning in accordance with an exemplary embodiment of the present invention.
FIG. 4A illustrates an example storage network configuration after partitioning in accordance with an exemplary embodiment of the present invention.
FIGS. 4B and 4C illustrate the device list and path list after partitioning in accordance with an exemplary embodiment of the present invention.

With reference now to the figures and in particular with reference to FIG. 1, a pictorial representation of an example storage network in which the present invention may be implemented is depicted in accordance with a preferred embodiment of the present invention. Storage network 100 contains fabric 120, which is a combination of interconnected switches, which collectively provide a routing infrastructure within storage network 100.

In the depicted example, host 102 is connected to fabric 120 along with disks 132, 134, 136, 138. Host 102 may be, for example, a personal computer, a network computer, a server, or the like. In the depicted example, host 102 access disks 132, 134, 136, 138 through paths in fabric 120. Storage network 100 may include additional hosts and/or other storage devices not shown. FIG. 1 is intended as an example, and not as an architectural limitation for the present invention.

In the depicted example, host 102 is connected to a plurality of host bus adapters (HBA) 112, 114, 116, 118. The disks may also be connected to host bus adapters; however, host bus adapters are now shown in this example for simplicity of illustration. In this example, the host is connected to fabric 102 through four host bus adapters. Host 102 may also include a device driver 104, which is a software component that controls access to disks 132, 134, 136, and 138.

FIG. 2A depicts an example storage network configuration in accordance with a preferred embodiment of the present invention. A host (not shown) is connected to a plurality of host bus adapters HBA0 212, HBA1 214, HBA2 216, and HBA3 218. In the depicted example, the target devices are disks disk0 232, disk1 234, disk2 236, and disk3 238. Host bus adapter HBA0 212 is connected to disk0 232 directly. HBA1 214 and HBA2 216 are connected to disk0 232, disk1 234, disk2 236, and disk3 238 through switch 220. HBA3 218 is connected to disk3 238 directly.

Switch 220 may be, for example, a fibre channel switch. For simplicity of illustration, one switch is shown; however, the storage network fabric may include a plurality of switches. With interconnection between switches and multiple levels of switches, the number of paths may become extensive.

Each path may have a different throughput. In the depicted example, the path through HBA0 212 has a throughput of 100; the path through HBA1 214 has a throughput of 200; the path through HBA2 216 has a throughput of 300; and, the path through HBA3 218 has a throughput of 400. The throughput of a path may vary depending upon the HBA capabilities and devices that lie in the path. For example, a storage network may include a plurality of switches, each of which may affect the throughput of the paths that include it. As another example, each disk device may be connected to the fabric through a HBA, each of which may also affect the throughput of the paths that include it.

Furthermore, the disk devices may have different loads. In example shown in FIG. 2A, disk0 232 has a load of 1; disk1 234 has a load of 10; disk 2 236 has a load of 5; and, disk 3 238 has a load of 20. The load of a disk device may be determined, for example, by identifying the number of requests and/or the amount of data to be moved to or from a given disk device.

In accordance with a preferred embodiment of the present invention, a mechanism is provided for load balancing among devices based on throughput and I/O load. The device driver, such as device driver 104 in FIG. 1, may have the capability to enable/disable paths through which I/O can be routed. In an exemplary embodiment of the present invention, enabling or disabling paths through the disk device driver dynamically partitions the paths. Paths are partitioned so a device may or may not use some of its available paths for I/O. Some paths may be partitioned to another device if the other device has a greater load of I/O requests. This partitioning may occur at a predefined interval configurable by a system administrator, for example.

The mechanism of the present invention first collects information about the configuration of the storage network. FIGS. 2B and 2C are examples that illustrate information collected for the storage network configuration shown in FIG. 2A in accordance with an exemplary embodiment of the present invention. More particularly, FIG. 2B illustrates a list of devices connected to each path sorted by I/O load. The paths are identified by HBA, since each HBA has a unique path to each disk device. However, a person of ordinary skill in the art will recognize that, in a more complex storage network configuration, several paths may exist between each HBA and disk device. In such a case, the path may be identified by identifying each device (HBA, switch, etc.) in the path. Each list of devices connected to a HBA is referred to herein as a "device list." FIG. 2C illustrates a list of paths to which a device is connected sorted by throughput herein referred to as a "path list."

After the configuration information is collected, the mechanism partitions the paths. First, the mechanism selects the highest throughput path. If only one device is attached to this path, the mechanism skips to the next highest throughput path. Then, the mechanism selects the highest load device connected to a selected path using the device list. If only a single device exists, then the mechanism selects the next highest throughput path.

If, however, more than one device is connected to a selected path, the mechanism attempts to disable the selected path to all devices other than the highest load device on the device list. For each device, the mechanism consults a path list. If only the selected path is in the path list, then the mechanism skips this device; otherwise, the mechanism disables the selected path and updates the path list and the device list accordingly.

The mechanism repeats the above procedure until all paths have been examined. Applying this procedure to the example shown in FIGS. 2A-2C, path HBA3 is selected because it has the highest throughput. Examining the device list reveals that only one device is connected to this path. Therefore, the procedure considers the next highest throughput path, which is HBA2. Using the device list for HBA2, the highest load device is disk3. The procedure then attempts to disable the HBA2 path to disk1, disk2, and disk0. Since all three of these devices have alternative paths other than HBA2, the HBA2 path is disabled for these three devices.

FIGS. 3A and 3B illustrate the updated device list and path list after a first pass of partitioning in accordance with an exemplary embodiment of the present invention. The remaining paths are then examined and partitioned. Path HBA1 is selected. The highest load device connected to HBA1 is disk3; therefore, the procedure attempts to disable path HBA1 for disk1, disk2, and disk0. Since disk1 and disk2 only have one path, these devices are skipped. However, disk0 has an alternate path, so HBA1 is disabled for disk0.

The last path to examine is HBA0. Since HBA0 only has a single device attached, it is skipped. FIG. 4A illustrates an example storage network configuration after partitioning in accordance with an exemplary embodiment of the present invention. FIGS. 4B and 4C illustrate the device list and path list after partitioning in accordance with an exemplary embodiment of the present invention. Since disk3 has the highest load in the illustrated example, the partitioning procedure favors disk3 to have the most available paths to route I/O, namely paths HBA1, HBA2, and HBA3. Device disk1 and disk2 only have a single path to HBA1 to route I/O. Device disk0 is left with only a single path HBA0.

When the next time interval is reached, a new snap shot of the storage network configuration is taken, including determining throughput for the HBAs and load for the disk devices. The same partitioning procedure may then be applied to determine the next partitioning. The dynamic partitioning of paths results in a potential gain in I/O subsystem performance, because path resources are more effectively load balanced.

Figure 5:
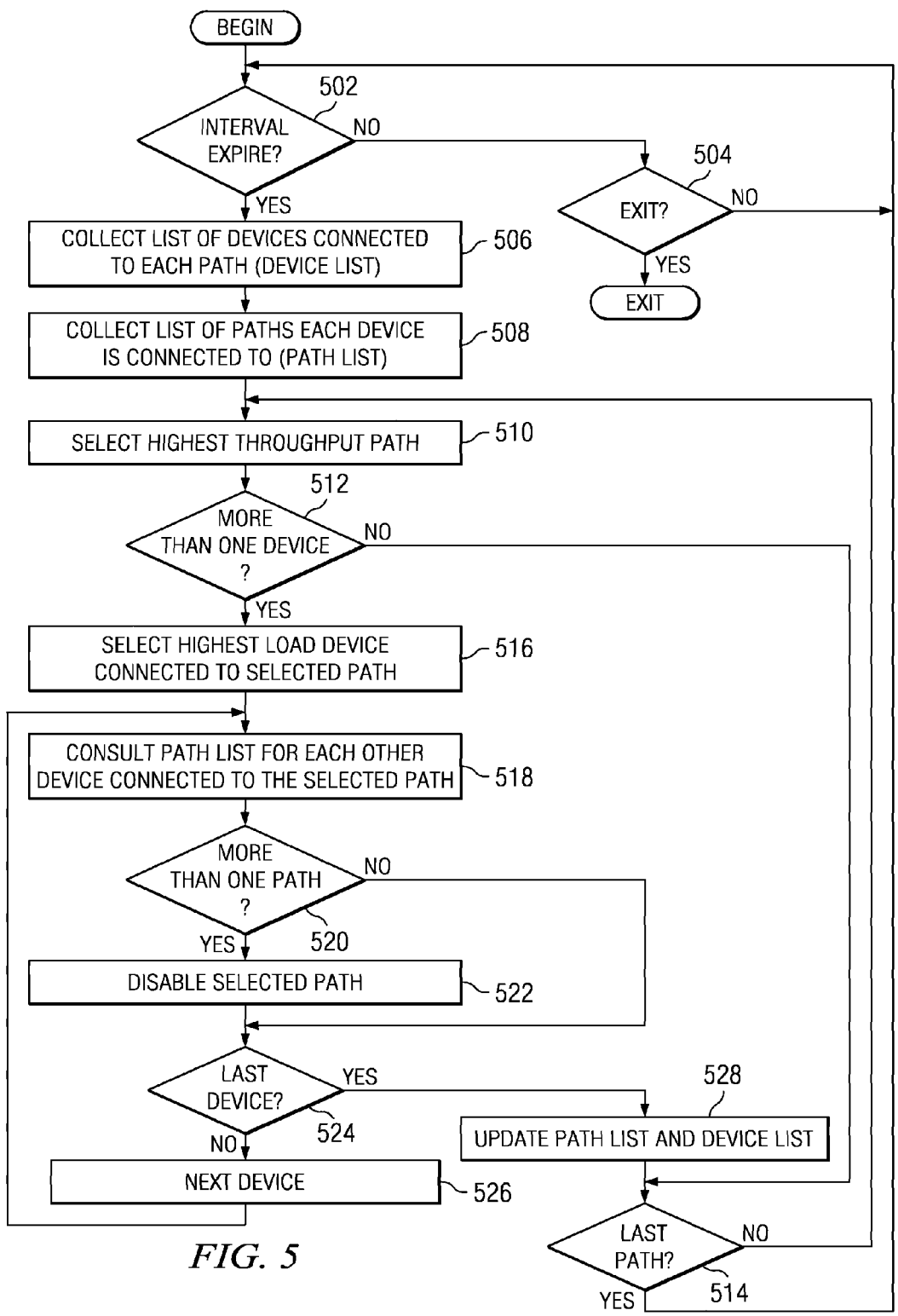
FIG. 5 is a flowchart illustrating a partitioning procedure in accordance with an exemplary embodiment of the present invention.

FIG. 5 is a flowchart illustrating a partitioning procedure in accordance with an exemplary embodiment of the present invention. The procedure begins and a determination is made as to whether a partitioning interval is expired (block 502). The partitioning interval may be a predetermined interval, as set by an administrator, for example. If the partitioning interval is not expired, a determination is made as to whether an exit condition exists (block 504). An exit condition may exist, for example, when a host system shuts down. If an exit condition exists, then the procedure ends; otherwise, the procedure returns to block 502 to determine whether the partitioning interval is expired.

If the partitioning interval is expired in block 502, the procedure collects a list of all devices connected to each path, sorted by device load (block 506). Then, the procedure collects a list of all paths two which each device is connected, sorted by throughput (block 508). Next, the procedure selects the highest throughput path (block 510). A determination is made as to whether more than one device is connected to the selected path (block 512). If only one device is connected to the path, a determination is made as to whether the selected path is the last path (block 514). If the selected path is the last path to consider, then the procedure returns to block 502 to determine whether the partition interval is expired. If the selected path is not the last path to consider in block 514, the procedure returns to block 510 to select the remaining path with the highest throughput.

Returning to block 512, if more than one device is connected to the selected path, the procedure selects the highest load device connected to the selected path (block 516) and consults the path list for each other device connected to the selected path (block 518). A determination is made as to whether more than one path is in the path list for a given device other than the highest load device (block 520). If only one path is in the path list, the procedure determines if this is the last device to consider in block 524. Otherwise the next device is selected in block 526 and returns to block 518 to consult the path list for the selected device that is not the highest load device.

If more than one path is in the path list in block 520, the procedure disables the selected path for the device (block 522) and a determination is made as to whether the device is the last device to consider (block 524). If the device is not the last device to consider, the procedure considers the next device in block 526 and returns to block 518 to consult the path list for this device that is not the highest load device. Blocks 518-526 repeat until block 524 determines that only one device is connected to the selected path or each device other than the highest load device has only one path.

If block 524 determines that the last device is considered, the procedure updates the path list 528 and continues to block 514 to determine whether the selected path is the last path. Blocks 510-528 repeat until every path is considered. When block 514 determines that all paths have been considered, partitioning is complete.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
   a bus system;
   a plurality of host bus adapters, wherein each host bus adapter within the plurality of host bus adapters forms a path to one or more of a plurality of devices;
   a memory connected to the bus system, wherein the memory includes a set of instructions;
   a processing unit connected to the bus system, wherein the processing unit executes the set of instructions to collect configuration information for a plurality of paths connecting a host to a plurality of devices in response to expiration of a partitioning interval, identify a throughput for each path within the plurality of paths based on the configuration information, identify a load for each device with the plurality of devices based on the configuration information, and selectively disable paths for devices based on the throughput for each path and the load for each device;
   wherein the processing unit executes the set of instructions to select a highest throughput path from within the plurality of paths, identify a highest load device connected to the highest throughput path from within the plurality of devices, and attempt to disable the highest throughput path for each device, other than the highest load device, connected to the highest throughput path; and
   wherein the processing unit executes the set of instructions to identify, for each path within the plurality of paths, a device list defining a subset of devices within the plurality of devices connected to a given path and identify, for each device within the plurality of devices, a path list defining a subset of paths within the plurality of paths connected to a given device.

2. The data processing system of claim 1, wherein the processing unit executes the set of instructions to consult the path list for each device other than the highest load device and disable the highest throughput path in response to there being more than one path in the path list.

3. A computer product comprising:
   a computer storage medium having computer executable instructions, when the computer executable instructions are executed by a processor cause a computer to, dynamically partition paths to multi path storage devices, the computer program product including:
   computer executable instructions for, in response to expiration of a partitioning interval, collecting configuration information for a plurality of paths connecting a host to a plurality of devices;
   computer executable instructions for identifying a throughput for each path within the plurality of paths based on the configuration information;
   computer executable instructions for identifying a load for each device within the plurality of devices based on the configuration information; and
   computer executable instructions for selectively disabling paths for devices based on the throughput for each path and the load for each device;
   wherein the computer executable instructions for selectively disabling paths includes:
      computer executable instructions for selecting a highest throughput path from within the plurality of paths;
      computer executable instructions for identifying a highest load device connected to the highest throughput path from within the plurality of devices; and
      computer executable instructions for attempting to disable the highest throughput path for each device, other than the highest load device, connected to the highest throughput path; and
   wherein the computer executable instructions code for collecting configuration information includes:
      computer executable instructions for identifying the plurality of paths;
      computer executable instructions for identifying, for each path within the plurality of paths, a device list defining a subset of devices within the plurality of devices connected to a given path; and
   wherein the computer executable instructions for collecting configuration information includes:
      computer executable instructions for identifying the plurality of devices; and
      computer executable instructions for identifying, for each device within the plurality of devices, a path list defining a subset of paths within the plurality of paths connected to a given device.

4. The computer program product of claim 3, further comprising:
   computer executable instructions for, in response to the identified highest load device being the only device in the device list for the highest throughput path, selecting a next highest throughput path.

5. The computer program product of claim 3, wherein the computer executable instructions for attempting to disable the highest throughput path for each device, other than the highest load device, connected to the highest throughput path includes:

computer executable instructions for consulting the path list for each device other than the highest load device; and computer executable instructions for, in response to there being more than one path in the path list, disabling the highest throughput path.

6. The computer program product of claim 3, further comprising:

computer executable instructions for in response to disabling a path for a device, updating a corresponding path list and a corresponding device list.

7. The computer program product of claim 3, further comprising:

computer executable instructions for repeating the steps of selecting a highest throughput path remaining in the plurality of paths, identifying a highest load device connected to the selected highest throughput path, and attempting to disable the selected highest throughput path for each device, other than the identified highest load device, connected to the selected highest throughput path until all paths are considered.

* * * * *